(12) United States Patent
Dean, Jr. et al.

(10) Patent No.: US 6,210,045 B1
(45) Date of Patent: Apr. 3, 2001

(54) ALIGNMENT SLEEVE FOR ALIGNING FERRULES AND ASSOCIATED ASSEMBLY METHOD

(75) Inventors: David L. Dean, Jr.; Karl M. Wagner, both of Hickory, NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/222,619

(22) Filed: Dec. 29, 1998

(51) Int. Cl.[7] .................................................. G02B 6/38
(52) U.S. Cl. ................... 385/72; 385/60; 385/64; 385/78; 385/82; 385/70
(58) Field of Search ............................. 385/70, 72, 60, 385/64, 78, 82

(56) References Cited

U.S. PATENT DOCUMENTS 5,600,747 * 2/1997 Yamakawa et al. ................... 385/59

* cited by examiner

Primary Examiner—Frank G. Font
Assistant Examiner—Reginald A. Ratiff

(57) ABSTRACT

An alignment sleeve for precisely aligning a pair of ferrules, such as a pair of multifiber ferrules, is provided along with an associated assembly method. The alignment sleeve includes a sleeve member defining a lengthwise extending cavity opening through opposed ends thereof. The sleeve member can also define at least one window and, more commonly, a plurality of windows opening into the cavity. The alignment sleeve also includes a guide pin extending lengthwise through the cavity and a guide pin engagement member extending at least partially into the window defined by the sleeve member. The guide pin engagement member is bonded, such as by welding, to the guide pin such that the guide pin is retained in a floating relationship within the sleeve member. The sleeve member can also define an expansion window to accommodate expansion of the guide pin that is creating during welding of the guide pin. By retaining the guide pins in a floating relationship within the sleeve member, the alignment sleeve aligns the ferrules with increased precision since the precision of the alignment is dictated, not by the precision with which the alignment sleeve is fabricated, but by the precision with which the closely toleranced ferrules are formed.

21 Claims, 4 Drawing Sheets

ALIGNMENT SLEEVE FOR ALIGNING FERRULES AND ASSOCIATED ASSEMBLY METHOD

FIELD OF THE INVENTION

The present invention relates generally to the alignment of optical fibers and, more particularly, to alignment sleeves for aligning ferrules and associated assembly methods.

BACKGROUND OF THE INVENTION

Optical fibers are used in an increasing number and variety of applications, such as a wide variety of telecommunications and data transmission applications. As a result, optical fibers must frequently be aligned and interconnected to permit optical signals to be coupled between the optical fibers with little attenuation. While a variety of techniques have been developed for reliably interconnecting individual optical fibers, multifiber cables or ribbons are being increasingly employed and must therefore be frequently interconnected to other multifiber cables or ribbons. As known to those skilled in the art, the interconnection of multifiber cables is significantly more challenging than the interconnection of individual optical fibers since each respective optical fiber of one multifiber cable must be simultaneously aligned with a corresponding optical fiber of the other multifiber cable. As explained below, the challenges presented by the interconnection of multifiber cables is further exacerbated in instances in which the multifiber cables are mounted upon the end portions of single mode optical fibers.

Conventional multifiber cables are interconnected by first mounting an appropriate multifiber ferrule upon the end portions of a plurality of optical fibers. For example, the DC ferrule supplied by Siecor Corporation of Hickory, N.C. can be mounted upon the end portions of two optical fibers, and the QC ferrule also provided by Siecor Corporation can be mounted upon the end portions of four optical fibers. After assembling the remainder of the multifiber connectors, the ferrules are inserted into opposed ends of an alignment sleeve which attempts to align the ferrules and, more particularly, the optical fibers upon which the ferrules are mounted. Some multifiber ferrules, such as the DC and QC ferrules, have opposed side surfaces that define lengthwise extending grooves. As such, the alignment sleeves may include a pair of diametrically opposed, lengthwise extending alignment ribs for engaging respective ones of the grooves defined by the ferrules. The engagement of the alignment ribs and the grooves defined by the ferrule serve to orient the ferrules and, more specifically, the optical fibers upon which the ferrules are mounted.

Modern applications are demanding ever increasing precision with respect to the alignment of optical fibers. In particular, increased alignment precision is demanded in instances in which single mode optical fibers are aligned in view of the extremely small size of the cores of the single mode optical fibers. As such, conventional alignment sleeves for aligning multifiber ferrules have not been entirely successful in aligning optical fibers and, in particular, single mode optical fibers requiring the demanded precision. In this regard, some alignment sleeves include integrally molded or otherwise integrally formed alignment ribs. As a result of the tolerances inherent in molding or other fabrication techniques, the alignment ribs may not be precisely positioned in a diametrically opposed relationship and may not extend perfectly parallel to each other and to the longitudinally axis defined by the alignment sleeve. As such, the alignment ribs may introduce at least some misalignment between the ferrules and, more particularly, between the individual optical fibers upon which the ferrules are mounted. Although this slight misalignment is generally acceptable for multimode applications, the interconnection of multiple single mode fibers demands greater alignment precision and may not tolerate such misalignment, albeit slight misalignment, in certain applications.

Another type of alignment sleeve is disclosed by U.S. Pat. No. 5,737,463 which issued Apr. 7, 1998 to Roger E. Weiss, et al. (hereinafter the "Weiss '463 patent"). The Weiss '463 patent discloses an alignment sleeve for receiving and aligning multifiber ferrules. Alignment members are held within the alignment sleeve such that the alignment members extend lengthwise along opposed interior side surfaces of the alignment sleeve. As such, the alignment members can engage the grooves defined by the opposed side surfaces of the multifiber ferrules in order to align the optical fibers upon which the multifiber ferrules are mounted. The alignment members are held within the alignment sleeve by hook portions which protrude through respective windows defined by the side surfaces of the alignment sleeve. In particular, the hook members engage corresponding reduced diameter portions of the alignment members such that the alignment members are held in place against the side surfaces of the alignment sleeve. As will be apparent, the alignment members described by the Weiss '463 patent must therefore be specially fabricated to include a pair of reduced diameter portions that have a predetermined depth, width and spacing.

Notwithstanding the various conventional alignment sleeves, including the alignment sleeve described by the Weiss '463 patent, a need still exist for alignment sleeves which will align a pair of multifiber ferrules and, more particularly, which will align the plurality of optical fibers upon which the multifiber ferrules are mounted with increased precision. In particular, a need exists for alignment sleeves which can align multifiber ferrules with the precision required to facilitate interconnection of a plurality of single mode optical fibers.

SUMMARY OF THE INVENTION

According to the present invention, an alignment sleeve for precisely aligning a pair of ferrules, such as a pair of multifiber ferrules mounted upon the end portions of a plurality of single mode fibers, is provided along with an associated assembly method. The alignment sleeve includes a sleeve member defining a lengthwise extending cavity opening through opposed ends thereof. The sleeve member also defines at least one window opening into the cavity. The alignment sleeve also includes a guide pin extending lengthwise through at least a portion of the cavity and a guide pin engagement member extending at least partially into the window defined by the sleeve member. According to the present invention, the guide pin engagement member is bonded to the guide pin such that the guide pin is retained in a floating relationship within the sleeve member. By securing the guide pin in a floating relationship within the sleeve member, the alignment sleeve of the present invention can provide more precise alignment than conventional alignment sleeves, including the precise alignment required to align multifiber ferrules that are mounted upon end portions of a plurality of single mode optical fibers. In this regard, since the guide pins are retained in a floating relationship, the precision of the alignment is dictated, not by the precision with which the alignment sleeve is fabricated, but by the precision with which the ferrules are formed. Since ferrules are generally formed with significantly greater precision than alignment sleeves or other connector components, the alignment sleeve of the present invention therefore permits more precise alignment of the ferrules and, in turn, the optical fibers upon which the ferrules are mounted.

The guide pin engagement member preferably extends into the window defined by the sleeve member so as to tangentially contact the guide pin. As such, the guide pin engagement member can be bonded to the guide pin without extending into the lengthwise extending cavity defined by the sleeve member. While the guide pin engagement member can be bonded in a variety of manners, the guide pin engagement member is commonly welded to the guide pin. By bonding the guide pin engagement member to the guide pin, the guide pin can have a relatively simple construction and is typically composed of a pair of opposed tapered end portions and a cylindrical portion having a constant diameter extending between the opposed end portions. As a result of the relatively simple construction of the guide pin, the guide pin can be fabricated with great precision, thereby further increasing the precision with which the alignment sleeve of the present invention aligns the pair of ferrules.

The sleeve member also typically defines a lengthwise extending groove opening into the cavity and intersecting the window in order to facilitate positioning of the guide pin within the sleeve member. According to this embodiment, the guide pin is seated within the lengthwise extending groove such that a portion of the guide pin passes by the window defined by the sleeve member. After positioning a guide pin engagement member at least partially within the window, the guide pin engagement member can be bonded to the guide pin such that the guide pin is retained in a floating relationship within the sleeve member. Since the guide pin is seated within a groove, however, the guide pin engagement member need not extend into the cavity defined by the sleeve member in order to make contact with and be bonded to the guide pin.

In one advantageous embodiment, the sleeve member defines at least two windows opening into the cavity and spaced apart in a lengthwise extending direction. The alignment sleeve of this embodiment also includes first and second guide pin engagement members extending at least partially into respective windows so as to be bonded to the guide pin, thereby also retaining the guide pin in a floating relationship within the sleeve member.

According to one embodiment, the sleeve member defines at least two windows opening into the cavity that are angularly spaced apart relative to the lengthwise extending axis defined by the sleeve member. In this embodiment, the alignment sleeve further includes first and second guide pins extending lengthwise through the cavity. In addition, the alignment sleeve of this embodiment includes first and second guide pin engagement members extending at least partially into respective windows so as to be bonded to respective guide pins. As such, the first and second guide pins can both be retained in a floating relationship within the sleeve member in order to engage the lengthwise extending grooves defined by the opposite side surfaces of a pair of ferrules, such as a pair of multifiber ferrules. In this embodiment, the first and second guide pin engagement members can be interconnected so as to form a guide pin engagement clip that is bonded to the first and second guide pins.

According to another embodiment, the guide pin engagement member is integral with the sleeve member such that the sleeve member is directly bonded to the guide pin. For example, the sleeve member can include a tang extending at least partially into the window to thereby serve as the guide pin engagement member for bonding to the guide pin. In embodiments in which the sleeve member is directly bonded to the guide pin, the sleeve member can define an expansion window aligned with a guide pin so as to accommodate any expansion of the guide pin created upon bonding of the sleeve member to the guide pin. In one embodiment in which the expansion window is defined by a medial portion of the sleeve member, the sleeve member is bonded to the guide pin at bond locations on opposite sides of the expansion window.

While the alignment sleeve of these alternate embodiments can define lengthwise extending grooves for receiving and positioning the guide pins relative to the sleeve member, the alignment sleeve can also include an inner positioning sleeve extending at least partially through the cavity defined by the sleeve member. In this embodiment, the inner positioning sleeve defines an elongate slot aligned with the expansion window defined by the sleeve member. By seating a guide pin within the elongate slot, the alignment sleeve of this embodiment insures that the guide pin passes by the expansion window defined by the sleeve member in order to accommodate any expansion which may occur during subsequent bonding operations.

Therefore, the alignment sleeve and associated assembly method of the various embodiments of the present invention provide more precise alignment for ferrules and, more particularly, for the optical fibers upon which the ferrules are mounted. In this regard, the retention of the guide pins in a floating relationship within the sleeve member permits the alignment sleeve to align the ferrules to within the limits of precision provided by the grooves defined by the ferrule. Since the ferrules are generally formed with much greater precision than the alignment sleeve and other connector components, the resulting alignment is also quite exact. As such, the alignment sleeve of the various embodiments of the present invention is well suited for precisely aligning multifiber ferrules, including those multifiber ferrules that are mounted upon the end portions of single mode optical fibers.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
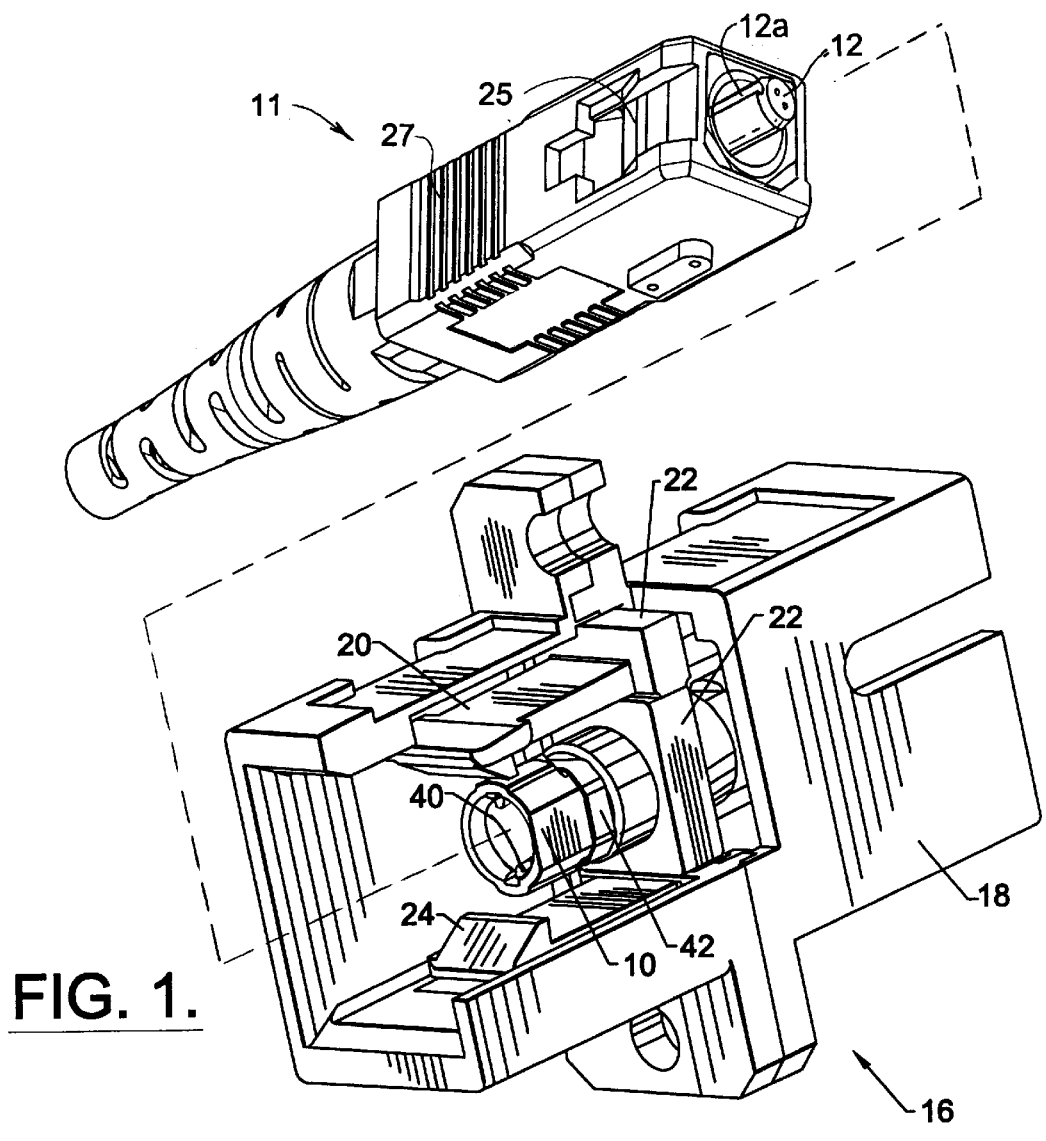
FIG. 1 is a perspective view of a sleeve assembly including a fiber optic connector and an alignment sleeve according to one embodiment of the present invention.

Referring now to FIG. 1, an alignment sleeve 10 according to one embodiment of the present invention is depicted along with a fiber optic connector 11 and an associated multifiber ferrule 12 adapted to be mounted upon the end options of a plurality of optical fibers in anticipation of insertion of the ferrule into one end of the alignment sleeve. Although the alignment sleeve which is illustrated and described hereinbelow is adapted to interconnect a pair of ferrules inserted into the opposed ends of the alignment sleeve, the alignment sleeve can also be disposed within receptacles, outlets or the like in which only a single ferrule is inserted into one end of the sleeve for interconnection with optical fibers or other optical devices that are already disposed in optical communication with the receptacle, outlet or the like. In addition, although the alignment sleeve will be illustrated and hereinafter described in connection with the alignment of a multifiber ferrule mounted upon the end portions of a plurality of optical fibers and, in particular, a plurality of single mode optical fibers, the alignment sleeve can also be utilized to align multifiber ferrules mounted upon the end portions of a plurality of multimode fibers or to align single fiber ferrules mounted upon the end portions of individual optical fibers. As a result of the precise alignment provided by the alignment sleeve of the prevent invention as described below, however, the alignment sleeve of the present invention is particularly well suited for aligning single mode optical fibers.

The sleeve assembly 16 of the illustrated embodiment of the present invention includes a housing 18. While the housing may be integrally formed, the housing is typically formed of first and second housing portions which are mounted about the other components of the sleeve assembly once the other components have been assembled. Once assembled, the housing defines a lengthwise extending passageway opening through opposed ends thereof. As such, fiber optic connectors can be inserted into the opposed ends of the housing in order to align the connectors and, more particularly, to align the optical fibers upon which the connectors are mounted. The sleeve assembly of the illustrated embodiment also includes a sleeve insert adapter 20 disposed within the housing. As shown, the sleeve insert adapter includes a medial portion 22 that is mechanically engaged by the housing and first and second pairs of latch members 24, such as SC type latch members, which extend outwardly in opposite directions from the medial portion for engaging corresponding openings 25 defined by the connector housing 27.

Figure 5:
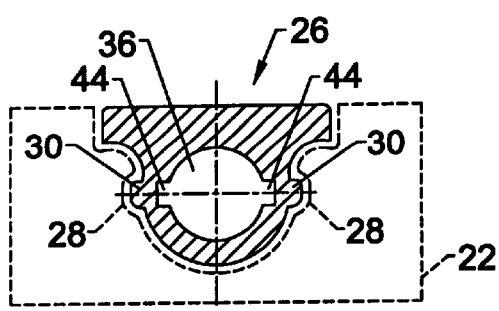
FIG. 5 is a cross-sectional view of a medial portion of the sleeve member illustrated in FIG. 3, taken along line 5—5, with the medial portion of the sleeve insert adapter depicted in dashed lines to illustrate the floating relationship of the medial portion of the sleeve member to the medial portion of the sleeve insert adapter.

As described in more detail below, the sleeve assembly 16 also includes an alignment sleeve 10 which is mounted within the sleeve insert adapter 20 and which extends lengthwise through the passageway defined by the housing 18. Although the alignment sleeve can be mounted to the sleeve insert adapter in a variety of fashions without departing from the spirit and scope of the present invention, the alignment sleeve of the illustrated embodiment includes a medial portion 26 which mechanically engages the medial portion 22 of the sleeve insert adapter. As best shown in FIG. 5, for example, the medial portion of the sleeve insert adapter includes a generally U-shaped saddle structure which defines recessed portions 28 in each of the opposed sides of the saddle structure. Conversely, the medial portion of the alignment sleeve of the illustrated embodiment includes a pair of projections 30 extending outwardly from opposite sides of the sleeve for engaging corresponding recesses defined by the saddle structure. In this regard, the medial portions of the alignment sleeve and the sleeve insert adapter are preferably sized such that the medial portion of the alignment sleeve can be snap fit into the medial portion of the sleeve insert adapter. In order to prevent relative lengthwise movement of the alignment sleeve and the sleeve insert adapter, the alignment sleeve of the illustrated embodiment also includes a pair of walls 31 that are spaced apart in a lengthwise extending direction such that the medial portion of the sleeve insert adapter is positioned between the walls once the medial portion of the alignment sleeve engages the saddle portion of the sleeve insert adapter. As such, the walls serve to prevent relative lengthwise movement between the alignment sleeve and the sleeve insert adapter. As shown in FIG. 5, the medial portion of alignment sleeve is retained in a floating relationship with respect to U-shaped saddle structure. As such, the alignment sleeve is permitted to move somewhat relative to the sleeve insert adapter, although the alignment sleeve will remain retained within the sleeve insert adapter. Other mechanisms for mounting the alignment sleeve within the sleeve insert adapter can be utilized, however, without departing from the spirit and scope of the present invention.

Figure 2:
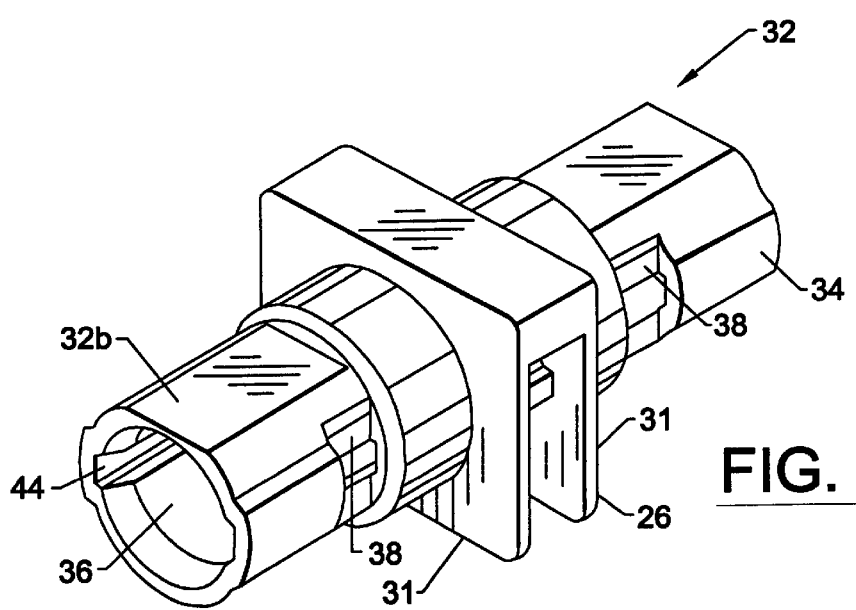
FIG. 2 is a perspective view of the sleeve member of the alignment sleeve illustrated in FIG. 1.
Figure 3:
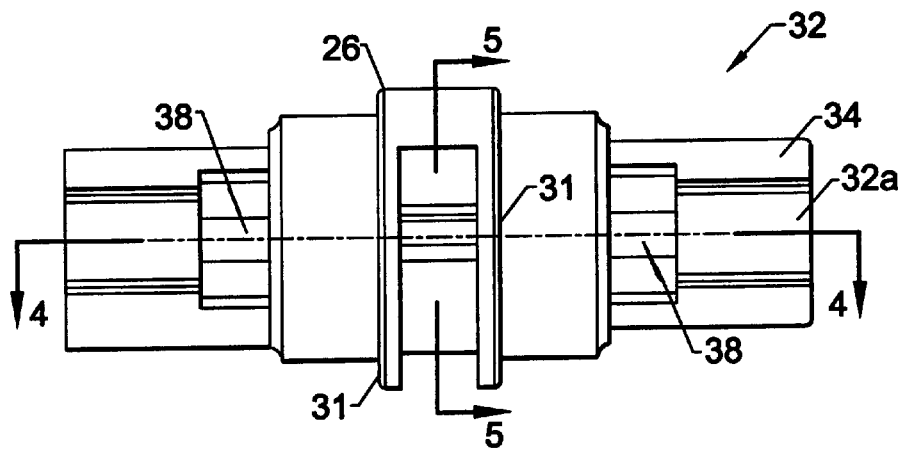
FIG. 3 is a side view of the sleeve member of FIG. 2.
Figure 4:
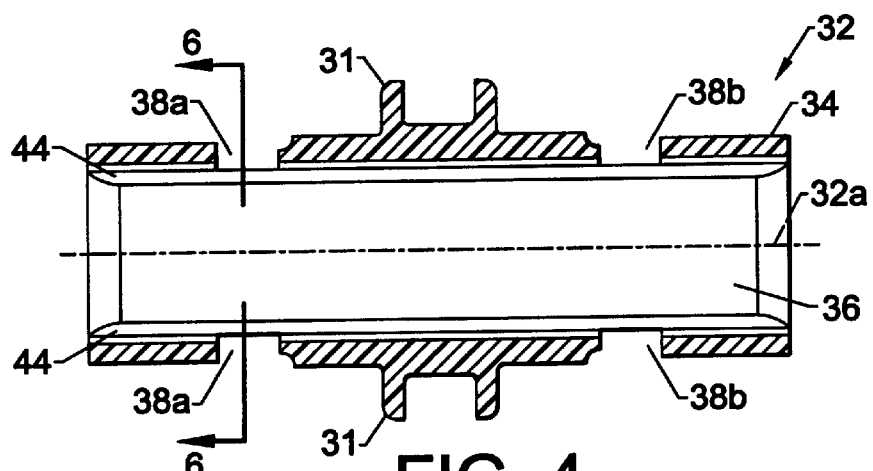
FIG. 4 is a cross-sectional view of the sleeve member illustrated in FIG. 3, taken along line 4—4.

As shown in FIGS. 2–4, the alignment sleeve 10 includes a sleeve member 32 comprising a housing 34 defining a lengthwise extending cavity 36 opening through opposed ends thereof. Typically, the sleeve member is formed of a thermoplastic material, such as nylon or ULTEM ™ material provided by General Electric Company. However, the sleeve member can be formed of a metal, a ceramic or other material, if so desired. As indicated in FIG. 1, the lengthwise extending cavity defined by the sleeve member is preferably sized and shaped to snuggly receive a predetermined type of ferrule 12, such as a DC ferrule, a QC ferrule or the like.

According to the present invention, the sleeve member 32 also defines at least one window 38 opening into the cavity 36. As best illustrated in FIG. 4, the sleeve member of one advantageous embodiment includes a plurality of windows opening into different portions of the cavity. As described below, the alignment sleeve of the present invention also includes guide pins 40. As such, the sleeve member preferably defines at least two windows associated with each guide pin. Since the sleeve member illustrated in FIGS. 1–4 is designed to receive a pair of guide pins, the sleeve member preferably defines at least four windows opening into the cavity.

More particularly, the sleeve member 32 preferably defines first and second pairs of windows 38a, 38b in which the windows of each respective pair of windows are angularly or circumferentially spaced apart relative to the lengthwise extending axis 32a defined by the sleeve member. See FIG. 4. Since the angular spacing of the windows of each respective pair of windows is defined by the desired position of the guide pins 40 within the alignment sleeve 10, the windows of each respective pair of windows are preferably angularly spaced apart by the same amount. For example, the windows of each respective pair of windows are typically diametrically opposed so as to be angularly spaced by about 180°.

As shown in FIGS. 2–4, the first and second pairs of windows 38a, 38b are also preferably spaced apart in a lengthwise extending direction. Thus, the first and second pairs of windows are preferably defined on opposite sides of the medial portion 26 of the alignment sleeve 10. In addition, the first and second pairs of windows are preferably defined by the sleeve member 32 such that respective windows of each pair of windows are aligned in a lengthwise extending direction, i.e. along a line parallel to the lengthwise extending axis 32a defined by the sleeve member.

Figure 6:
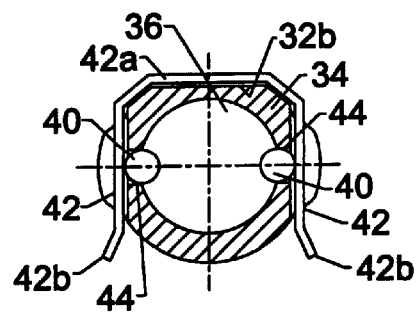
FIG. 6 is a cross-sectional view of the sleeve member illustrated in FIGS. 3 and 4, taken along line 6—6, in which guide pins and guide pin engagement members have been added to illustrate the bonding of the guide pins with respective guide pin engagement members and in which the guide pin engagement members are slightly spaced from the sleeve member as in instances in which a ferrule has been inserted into the alignment sleeve.

As shown in FIGS. 1 and 6, the alignment sleeve 10 of the present invention also includes one and, more typically, a pair of guide pins 40 disposed within and extending through at least a portion of the cavity 36 defined by the sleeve member 32. In particular, the guide pins are preferably positioned within the cavity defined by the sleeve member such that the guide pins extend lengthwise through the cavity and pass by respective ones of the windows 38. With respect to the illustrated embodiment of the alignment sleeve, for example, the guide pins are preferably positioned within the sleeve member such that each guide pin passes by two different windows that are aligned in a lengthwise extending direction, namely, through one of the windows of each pair of windows 38a, 38b. Although the alignment sleeve is shown to include guide pins that extend continuously therethrough, the guide pins need only extend a limited lengthwise distance, such as 3 mils, on each side of the windows in order to provide the desired alignment function. As such, each guide pin can be comprised of two or more guide pin segments which pass by respective windows, if so desired.

For the reasons described below, the guide pins 40 need not define any portions of reduced diameter. As such, the guide pins generally include a cylindrical portion having a constant diameter extending between opposed end portions. In order to facilitate the insertion of the ferrules 12 into the alignment sleeve 10, the opposed end portions of the guide pins are generally tapered or beveled as shown. As a result of the relatively simple construction of the guide pins, the guide pins can be fabricated with great precision, i.e., generally within about ±0.5 micron in diameter. Although the guide pins can be formed of a variety of materials, the guide pins are typically formed of metal, such as stainless steel.

Figure 7:
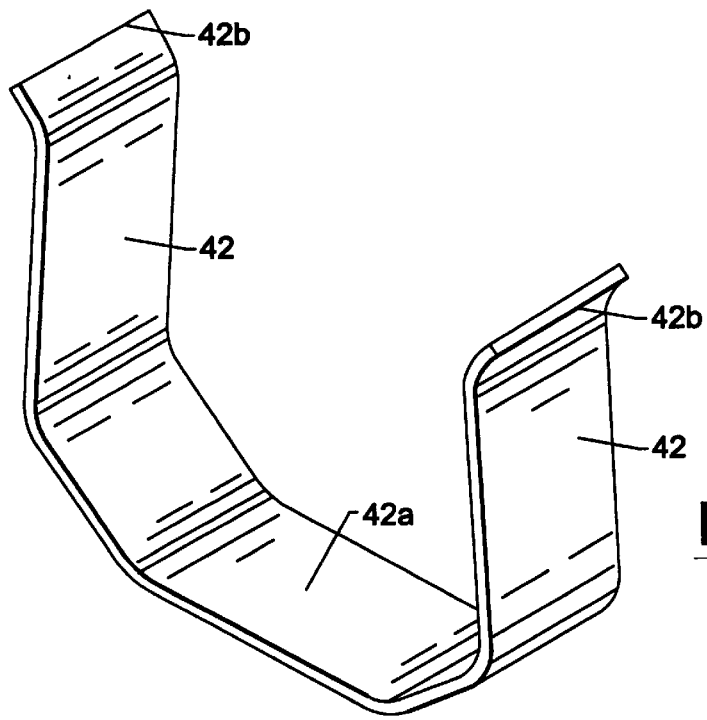
FIG. 7 is a perspective view of a guide pin engagement clip according to one embodiment to the present invention.

The alignment sleeve 10 of the present invention also includes a guide pin engagement member 42 extending at least partially into a window 38 defined by the sleeve member 32. More typically, the alignment sleeve has an equal number of guide pin engagement members as windows, such that each guide pin engagement member can extend at least partially into a respective window. Although each guide pin engagement member can be a separate and independent member, the guide pin engagement members of one advantageous embodiment are formed in pairs which are interconnected so as to form guide pin engagement clips. See, for example, FIGS. 6 and 7. In this embodiment, the guide pin engagement members which will extend into a pair of angularly separated windows 38a, 38b are interconnected to form a generally U-shaped or C-shaped guide pin engagement clip having a shape that generally matches and is complimentary to the exterior surface of the sleeve member. For example, although the sleeve member generally has a cylindrical exterior surface, the sleeve member can define a lengthwise extending planar portion 32b. As such, the guide pin engagement clip can also define a flattened portion 42a for engaging the corresponding planar portion of the sleeve member in order to orient the guide pin engagement clip relative to the sleeve member and, more particularly, relative to the windows defined by the sleeve member. In addition, the opposed ends 42b of the guide pin engagement clip can be flared outwardly in order to facilitate mounting of the guide pin engagement clip upon the sleeve member. See FIG. 7. Although the guide pin engagement clip has the same general shape as the sleeve member, the guide pin engagement clip is preferably slightly larger than the sleeve member, as shown in FIG. 6, to permit the guide pin engagement clip to be free floating relative to the sleeve member.

As also shown in FIG. 6, the guide pin engagement member 42 extends into the window 38 defined by the sleeve member 32, but generally does not extend into the lengthwise extending cavity 34. By extending into the window defined by the sleeve member, the guide pin engagement member preferably tangentially contacts a portion of the guide pin 40 proximate or facing the sleeve member. In other words, the guide pin engagement member preferably contacts that portion of the guide pin which is exposed through the window defined by the sleeve member. The guide pin engagement member is then bonded to the guide pin. While the guide pin engagement member can be bonded by an adhesive, an epoxy or the like, the guide pin engagement member is preferably welded, such as by tack welding or spot welding, to the guide pin. As such, the guide pin engagement member is preferably formed of a weldable material, such as a metal and, more particularly, stainless steel.

Since the guide pin engagement members 42 are larger than the windows 38 defined by the sleeve member 32, the bonding of the guide pin engagement member to the guide pin will retain the guide pin 40 within the sleeve member. However, since each window defined by the sleeve member is larger than the corresponding bond between the guide pin engagement member and the guide pin, and since the guide pin engagement clip is slightly larger than the sleeve member, the alignment sleeve 10 of the present invention permits at least some movement of the guide pin relative to the sleeve member such that the guide pin is retained in a floating relationship within the sleeve member.

In this regard, the guide pin engagement clip is preferably formed such that the opposed sides of the U-shaped or C-shaped clip are biased inwardly so as to contact the opposed side surfaces of the sleeve member 32 in the absence of other forces. Among other things, the inward biasing of the opposed sides of the guide pin engagement clip facilitate contact and, in turn, bonding between the guide pin engagement clip and the respective guide pins 40. Once a ferrule 12 is inserted into the sleeve member, however, the ferrule will force the guide pins and, in turn, the opposed sides of the guide pin engagement clip in an outward direction such that the guide pin engagement clip no longer contacts the sleeve member, such as shown in FIG. 6. As such, the guide pin engagement clip and the guide pins which are bonded thereto can therefore be maintained in a floating relationship with respect to the sleeve member.

In order to facilitate positioning of the guide pins 40 within the sleeve member 32 and to further facilitate contact of the guide pin engagement members 42 with the guide pins without requiring the guide pin engagement members to extend into the cavity 34 defined by the sleeve member, the sleeve member can also define at least one and, more commonly, a pair of lengthwise extending grooves 44 opening into the cavity and sized to receive a respective guide pin. In particular, a sleeve member of this advantageous embodiment preferably defines the same number of lengthwise extending grooves as guide pins such that each guide pin can be seated into a respective groove. Since the grooves will define, in large part, the relative angular spacing of the guide pins, the sleeve member preferably defines the grooves with a predetermined angular spacing relative to the lengthwise extending axis 32a defined by the sleeve member in which the predetermined angular spacing corresponds to the desired angular separation between the guide pins. For an alignment sleeve 10 which includes diametrically opposed guide pins, the sleeve member preferably defines a pair of lengthwise extending grooves that are angularly spaced apart by about 180° relative to the lengthwise extending axis defined by the sleeve member. Since the guide pins will not only sit within respective grooves, but also pass by one or more of the windows 38 defined by the sleeve member, the sleeve member also preferably defines the lengthwise extending grooves so as to intersect at least one window and, more typically, to intersect each of the windows that are aligned in a lengthwise extending direction.

While the sleeve member 32 can define grooves 44 having a variety of cross-sectional shapes and sizes, the sleeve member of one advantageous embodiment defines lengthwise extending grooves having a rectangular cross-section defined by a pair of parallel side surfaces and a bottom surface extending in a substantially perpendicular fashion between the side surfaces. However, the grooves can have a rounded or U-shaped cross-section, if so desired, without departing from the spirit and scope of the present invention. In addition, the depth and width of each groove can also vary without departing from the spirit and scope of the present invention. However, in one advantageous embodiment, the depth of each groove is equal to the radius or one-half of the diameter of the respective guide pin 40, and the width of the groove is slightly larger than the diameter of the guide pin, such as approximately 20 microns larger than the diameter of the respective guide pin. As such, the grooves defined by the sleeve member facilitate positioning of the guide pin in a lengthwise extending orientation in preparation for bonding the guide pin engagement members 42 to the guide pin.

Since the guide pins 40 sit within respective ones of the lengthwise extending grooves 44, the guide pin engagement members 42 need not extend into the cavity 34 defined by the sleeve member 32. Instead, the guide pin engagement members need only extend into the window 38 to a position proximate the bottom surface of the respective groove. As such, the guide pin engagement member can contact and, more typically, tangentially contact the guide pin in order to permit bonding of the guide pin engagement member and the respective guide pin.

Once the alignment sleeve 10 has been assembled by positioning guide pins 40 within the cavity 34 defined by the sleeve member 32 and bonding guide pin engagement members 42 to respective ones of the guide pins in order to retain the guide pins in a floating relationship within the sleeve member, the alignment sleeve is mounted within the sleeve insert adapter 20 and the housing 18 is then assembled thereabout. Therefore, ferrules 12, such as multifiber ferrules including the DC and QC ferrules, can be inserted into the opposite ends of the sleeve member in order to align the ferrules. As illustrated in FIG. 1 and as known to those skilled in the art, the side surfaces of many multifiber ferrules, such as the DC and QC ferrules, define outwardly opening, lengthwise extending alignment grooves 12a. Since the ferrules are typically formed of a ceramic material and, in any event, are formed with great precision, the relative position, size and shape of the alignment grooves defined by the ferrules, are also precisely defined. Upon inserting the ferrules into the opposed ends of the sleeve member, the guide pins 40 engage the respective alignment grooves such that the ferrules are aligned and the plurality of optical fibers 14 upon which the ferrules are mounted are also aligned in a precise manner. By retaining the guide pins within the sleeve member while permitting the guide pins to float relative to the sleeve member, the alignment precision is dictated by the precision with which the alignment grooves are defined by the ferrule and not by the precision with which an alignment sleeve defines alignment members as dictated by most conventional alignment sleeves. Therefore, the alignment sleeve of the present invention facilitates precise alignment and is particularly well suited for the precise alignment required for a plurality of single mode optical fibers.

Figure 8:
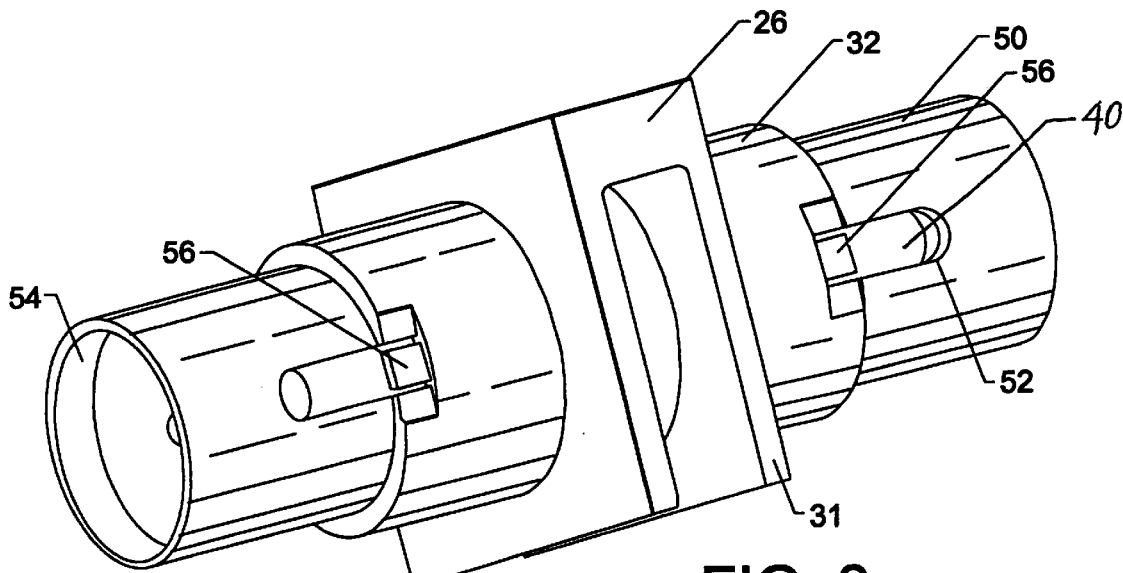
FIG. 8 is a perspective view of another embodiment of an alignment sleeve according to the present invention in which the sleeve member includes at least one tang that can be bonded to a guide pin.
Figure 9:
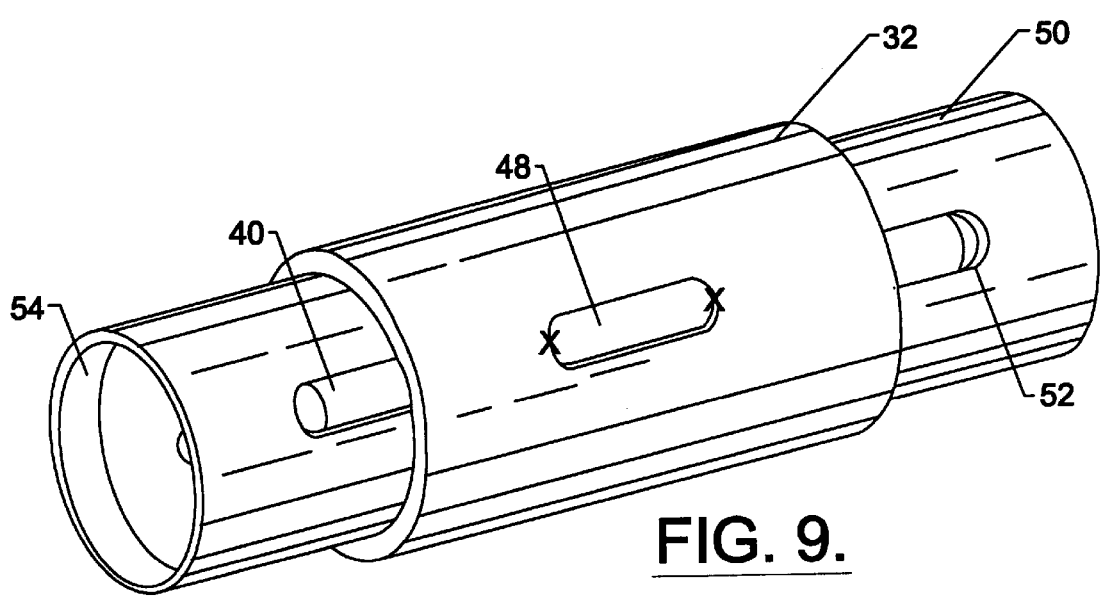
FIG. 9 is a perspective view of an alignment sleeve according to yet another embodiment in which the sleeve member defines an expansion window to accommodate expansion of the guide pin which may be created during the direct bonding of the sleeve member to the guide pin.

Many modifications and other embodiments of the invention will come to the mind of one skilled in the art to which this invention pertains having the benefit of the teachings presented in the foregoing descriptions and the associated drawings. For example, the guide pin engagement members 42 need not be a separate component as described hereinabove, but can be integrally formed with the sleeve member 32, as shown in FIGS. 8 and 9. In the embodiment of FIG. 8, for example, the sleeve member is formed such that a respective guide pin engagement member, typically in the form of a tang 56 or the like, extends into each window defined by the sleeve member. The tangs can then be bonded to the guide pins in order to retain the guide pins within the sleeve member while permitting the guide pins to float somewhat therein.

As will be apparent, the amount of floating of the guide pins 40 permitted by the alignment sleeve 10 of the embodiment of FIG. 8 is typically significantly less than that afforded by the embodiment of the alignment sleeve of FIGS. 1–6 which has separate and independent guide pin engagement members 42. In some instances, however, the alignment sleeve of the embodiment illustrated in FIG. 8 provides sufficient floatation such that the alignment sleeve of this embodiment will be preferred since it includes fewer discrete components.

Referring now in more detail to the embodiment of FIG. 8, each of the opposed side surfaces of the sleeve member 32 includes at least one and, more typically, a pair of tangs 56 proximate opposite ends. As such, the alignment sleeve 10 of this embodiment retains the guide pins 40 within the sleeve member by bonding the tangs to the guide pins, such as by welding. As illustrated in FIG. 8, each tang generally has a thickness which is less than the sidewall thickness of the sleeve member. In addition, opposite sides of the tang are preferably separated from adjacent portions of the sleeve member such that the tang projects in an outward direction from a respective end of the sleeve member. As such, the tang has at least some flexibility in order to facilitate limited movement or floating by the respective guide pins.

While the sleeve member 32 of the alignment sleeve 10 depicted in FIG. 8 can also define lengthwise extending grooves for receiving the guide pins 40 and for positioning the guide pins in an aligned relationship with respect to the tangs 56, the alignment sleeve of the illustrated embodiment includes an inner positioning sleeve 50 extending at least partially through the cavity defined by the sleeve member. As shown, the inner positioning sleeve defines a pair of elongate slots 52 extending along opposite side surfaces and aligned with the tangs. Each elongate slot defined by the inner positioning sleeve preferably has a length which equals or exceeds the length of the respective guide pin. In addition, the width of each elongate slot defined by the inner positioning sleeve is preferably slightly less than the diameter of the respective guide pin such that the guide pin can be seated and retained within the elongate slot. As such, the guide pins can be readily aligned relative to the sleeve member and, more particularly, relative to the tangs in preparation for bonding. As shown, the elongate slot therefore serves as the window through which the tang contacts and is bonded with a respective guide pin. As also illustrated, the inner positioning sleeve can include opposed end portions 54 which are somewhat tapered in order to facilitate insertion of ferrules 12 into the inner positioning sleeve.

As shown in FIG. 9, the alignment sleeve 10 of another embodiment includes a sleeve member 32 having a medial portion which defines an expansion window 48 opening into the lengthwise extending cavity. In this regard, the alignment sleeve of FIG. 9 also includes an inner positioning sleeve 50 defining at least one and, more typically, a pair of elongate slots 52 aligned with respective expansion windows defined by the sleeve member. As also shown, the alignment sleeve further includes at least one and, more typically, a pair of guide pins 40 seated within respective elongate slots so as to be exposed through the expansion windows. The sleeve member can then be bonded to the guide pin so as to retain the guide pin within the lengthwise extending cavity defined by the sleeve member. In the illustrated embodiment, for example, the sleeve member is bonded to the guide pin at bond location designated X that are positioned on opposite sides of the expansion window. By aligning the guide pins with a respective expansion window, however, the alignment sleeve of the present invention can accommodate expansion of the guide pins that may be created upon bonding the guide pin in the sleeve, thereby preventing the pin from buckling, bending, or otherwise being deformed.

It is therefore to be understood that the invention is not to be limited to the specific embodiments disclosed and that further modifications and other embodiments are intended to be included within the scope of the appended claims. Although specific terms are employed herein, they are used in a generic and descriptive sense only and not for purposes of limitation.

That which is claimed is:

1. An alignment sleeve for aligning a pair of ferrules, the alignment sleeve comprising:
    a sleeve member defining a lengthwise extending cavity opening through opposed ends thereof, said sleeve member also defining at least one window opening into the cavity;
    a guide pin disposed within and extending lengthwise through at least a portion of the cavity defined by said sleeve member; and
    a guide pin engagement member extending at least partially into the window defined by said sleeve member, said guide pin engagement member bonded to said guide pin such that said guide pin is retained in a floating relationship within said sleeve member.

2. An alignment sleeve according to claim 1 wherein said guide pin engagement member extends through the window defined by said sleeve member so as to tangentially contact a portion of said guide pin proximate said sleeve member.

3. An alignment sleeve according to claim 1 wherein said guide pin engagement member extends at least partially into the window defined by said sleeve member and is bonded to said guide pin without extending into the lengthwise extending cavity defined by said sleeve member.

4. An alignment sleeve according to claim 1 wherein said sleeve member defines at least two windows opening into the cavity and spaced apart in a lengthwise extending direction, wherein the alignment sleeve further comprises first and second guide pin engagement members extending at least partially into respective ones of the windows, and wherein said first and second guide pin engagement members are both bonded to said guide pin.

5. An alignment sleeve according to claim 1 wherein said sleeve member defines a lengthwise extending axis and at least two windows opening into the cavity that are angularly spaced apart relative to the lengthwise extending axis, wherein the alignment sleeve further comprises:
    first and second guide pins extending lengthwise through the cavity; and
    first and second guide pin engagement members extending at least partially into a respective window for engaging a respective guide pin such that said first and second guide pins are both retained in a floating relationship within said sleeve member.

6. An alignment sleeve according to claim 5 wherein said first and second guide pin engagement members are interconnected so as to form a guide pin engagement clip.

7. An alignment sleeve according to claim 1 wherein said guide pin engagement member is integral with said sleeve member.

8. An alignment sleeve according to claim 7 wherein said sleeve member comprises a tang extending at least partially into the window to thereby serve as said guide pin engagement member for bonding to said guide pin.

9. An alignment sleeve according to claim 1 wherein said sleeve member defines a lengthwise extending groove opening into the cavity and intersecting the window, and wherein said guide pin is seated within the lengthwise extending groove such that a portion of said guide pin passes by the window defined by said sleeve member.

10. An alignment sleeve member for aligning a pair of ferrules, the alignment sleeve member comprising:
    a housing defining a lengthwise extending cavity opening through opposed ends thereof, wherein said housing defines a lengthwise extending groove opening into the cavity and sized to receive a guide pin, and wherein said housing defines at least one window opening into the cavity and positioned such that the lengthwise extending groove intersects the at least one window.

11. An alignment sleeve member according to claim 10 wherein said housing defines at least two windows opening into the cavity and spaced apart in a lengthwise extending direction, wherein the at least two windows are positioned such that the lengthwise extending groove intersects each of the windows.

12. An alignment sleeve member according to claim 10 wherein said housing defines a lengthwise extending axis and first and second lengthwise extending grooves that open into the cavity and are angularly spaced apart relative to the lengthwise extending axis, and wherein said housing defines at least two windows opening into the cavity that are angularly spaced apart relative to the lengthwise extending axis and are positioned such that a respective lengthwise extending groove intersects each window.

13. An alignment sleeve member according to claim 12 wherein said the first and second lengthwise extending grooves defined by said housing are diametrically opposed.

14. An alignment sleeve member according to claim 12 wherein said housing comprises a guide pin engagement member that extends at least partially into the window for engaging a guide pin.

15. An alignment sleeve for aligning a pair of ferrules, the alignment sleeve comprising:

a sleeve member defining a lengthwise extending cavity opening through opposed ends thereof, said sleeve member also defining an expansion window opening into the cavity; and a guide pin disposed within and extending lengthwise through at least a portion of the cavity defined by said sleeve member, said guide pin positioned within the cavity in an aligned relationship with the expansion window defined by said sleeve member, wherein said sleeve member is bonded to said guide pin such that said guide pin is retained therein, and wherein the expansion window defined by said sleeve can accommodate expansion of said guide pin created by bonding of said guide pin and said sleeve member.

16. An alignment sleeve according to claim 15 further comprising an inner positioning sleeve extending at least partially through the cavity defined by said sleeve member, wherein said inner positioning sleeve defines an elongate slot aligned with the expansion window defined by said sleeve member, and wherein said guide pin is seated within the elongate slot such that said guide pin passes by the expansion window defined by said sleeve member.

17. An alignment sleeve according to claim 15 wherein the expansion window is defined by a medial portion of said sleeve member, and wherein said sleeve member is bonded to said guide pin at bond locations on opposite sides of the expansion window.

18. A method of assembling an alignment sleeve comprising the steps of:

providing a sleeve member defining a lengthwise extending cavity and at least one window opening into the cavity;

positioning a guide pin within the cavity defined by the sleeve member such that the guide pin extends lengthwise through at least a portion of the cavity and passes by the window;

positioning a guide pin engagement member at least partially within the window; and bonding the guide pin engagement member to the guide pin such that the guide pin is retained in a floating relationship within the sleeve member.

19. A method according to claim 18 wherein said bonding step comprises welding the guide pin engagement member to the guide pin.

20. A method according to claim 18 wherein said providing step comprises providing a sleeve member defining a lengthwise extending axis and at least two windows opening into the cavity that are angularly spaced apart relative to the lengthwise extending axis, wherein said guide pin positioning step comprises positioning first and second guide pins within the cavity such that said first and second guide pins extend lengthwise through the cavity and pass by respective ones of the windows, and wherein said guide pin engagement member positioning step comprises positioning first and second guide pin engagement members at least partially within respective ones of the windows, and wherein said bonding step comprises bonding each guide pin engagement member to a respective guide pin such that the first and second guide pins are both retained in a floating relationship within the sleeve member.

21. A method according to claim 18 wherein said providing step comprises providing a sleeve member defining a lengthwise extending groove opening into the cavity and intersecting the window, and wherein said guide pin positioning step comprises seating the guide pin within the lengthwise extending groove such that a portion of the guide pin passes by the window defined by the sleeve member.

* * * * *